United States Patent
Lin et al.

(10) Patent No.: US 6,519,116 B1
(45) Date of Patent: Feb. 11, 2003

(54) ACTUATOR ARM ASSEMBLY HAVING BEARING GAP FORMED BETWEEN BEARING OUTER RACE AND PIVOT SLEEVE FOR MITIGATING TORQUE RIPPLE ON ACTUATOR ARM IN A DISK DRIVE

(75) Inventors: Chen-Chi Lin, San Jose, CA (US); Kamran Oveyssi, San Jose, CA (US); Shawn E. Casey, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 51 days.

(21) Appl. No.: 09/728,625

(22) Filed: Nov. 30, 2000

(51) Int. Cl.⁷ .............................................. G11B 21/08
(52) U.S. Cl. ................................................... 360/265.6
(58) Field of Search ............................ 360/265.6, 265.2

(56) References Cited

U.S. PATENT DOCUMENTS

| | | | |
|---|---|---|---|
| 4,810,108 A | * | 3/1989 | Yajima |
| 5,161,077 A | * | 11/1992 | Jabbari |
| 5,315,465 A | * | 5/1994 | Blanks |
| 5,666,242 A | * | 9/1997 | Edwards et al. |
| 5,727,882 A | | 3/1998 | Butler et al. |
| 5,761,006 A | * | 6/1998 | Sri-Jayantha et al. |

* cited by examiner

Primary Examiner—Craig A. Renner
(74) Attorney, Agent, or Firm—W. Chris Kim, Esq.; Milad G. Shara, Esq.; Stetina Brunda Garred & Brucker

(57) ABSTRACT

An aspect of the invention can be regarded as an actuator arm assembly which includes an actuator arm having an actuator bore. The actuator arm is configured to pivot about an axis of rotation. The actuator bore has pivot sleeve contact areas. The actuator arm assembly includes a pivot cartridge which includes a pivot sleeve which is formed to exert compressive force radially from the axis of rotation. The pivot sleeve is formed to locally deform radially relative to the axis of rotation adjacent the pivot sleeve contact areas. The pivot cartridge includes a bearing outer race. The pivot cartridge includes a bearing gap formed between the bearing outer race and the pivot sleeve for inhibiting transfer of force between the pivot sleeve and the bearing outer race.

22 Claims, 3 Drawing Sheets

ACTUATOR ARM ASSEMBLY HAVING BEARING GAP FORMED BETWEEN BEARING OUTER RACE AND PIVOT SLEEVE FOR MITIGATING TORQUE RIPPLE ON ACTUATOR ARM IN A DISK DRIVE

BACKGROUND OF THE INVENTION

1. Field of the Invention

The present invention relates generally to rotary actuators for use in disk drives, and more particularly to an actuator arm assembly having bearing gap formed between bearing outer race and pivot sleeve for mitigating torque ripple on actuator arm in a disk drive.

2. Description of the Prior Art

A typical actuator arm assembly for use in a disk drive includes an actuator arm having an actuator bore disposed therethrough. The actuator arm is configured to pivot about an axis of rotation axially disposed within the actuator bore. A pivot sleeve is disposed within the pivot actuator bore. Within the pivot sleeve is a bearing assembly having an outer bearing race, inner bearing race and bearings balls therebetween. The outer bearing race is secured to the inner surface of the pivot sleeve.

A side screw is often utilized to attach the pivot sleeve to the actuator arm. The side screw tensile force and the compressive force from the contact interface between the actuator bore and pivot sleeve can deform the pivot sleeve. Such deformation of the pivot sleeve may result in deformation or distortion of the attached bearing outer race. High and inconsistent torque ripple is then generated by excessive distortion of the bearing outer race. Torque ripple results in an inconsistency in the amount of torque required to rotate the actuator arm during rotation thereof. Excessive torque ripple can cause error in the servo system and increase access time. The amount of torque ripple may be mitigated by increasing the thickness of the pivot sleeve. However this must be restricted by disk drive design constraints, such as actuator inertia, space about the pivot, servo performance, and drive assembly.

Accordingly, there is a need in the art for an improved actuator arm assembly which reduces excessive torque ripple in comparison to the prior art.

SUMMARY OF THE INVENTION

An aspect of the invention can be regarded as an actuator arm assembly for use in a disk drive. The actuator arm assembly includes an actuator arm having an actuator bore disposed therethrough. The actuator arm is configured to pivot about an axis of rotation axially disposed within the actuator bore. The actuator bore has pivot sleeve contact areas. The actuator arm assembly further includes a pivot cartridge concentrically received within the actuator bore. The pivot cartridge includes a pivot sleeve which is formed to exert compressive force radially from the axis of rotation against the actuator bore adjacent the pivot sleeve contact areas. The pivot sleeve is formed to locally deform radially relative to the axis of rotation adjacent the pivot sleeve contact areas. The pivot cartridge further includes a bearing outer race which is concentrically received within and partially concentrically attached to the pivot sleeve. The pivot cartridge further includes a bearing gap formed between the bearing outer race and the pivot sleeve for inhibiting transfer of force between the pivot sleeve and the bearing outer race, thereby mitigating deformation of the bearing outer race in order to mitigate torque ripple on the actuator arm about the axis of rotation.

In an embodiment of the present invention, the actuator arm further has a screw hole generally radially extending toward and perpendicular to the axis of rotation. The actuator arm assembly further includes a screw which is sized and configured to attach the pivot sleeve to the actuator arm. The actuator arm is formed to receive the screw with the screw being axially aligned perpendicular to the axis of rotation. The screw is engaged with the pivot sleeve between the pivot sleeve contact areas of an adjacentmost portion of the actuator bore. In this regard, the actuator bore has an actuator bore notch formed therein between the pivot sleeve contact areas.

In one embodiment, the pivot sleeve contact areas may be disposed about an arc which is less than 180 degrees about the axis of rotation. The pivot sleeve may have a gap portion which is disposed adjacent the bearing gap and an attachment portion which is attached to the bearing outer race. Further, the attachment portion may be adhesively bonded to the outer race. The gap portion is generally defined by an average first radius from the axis of rotation and the attachment portion is generally defined by an average second radius from the axis of rotation, with the average first radius being greater than the average second radius. Further, the pivot sleeve is formed to locally deform radially outward from the axis of rotation between the pivot sleeve contact areas. The pivot sleeve may have two pivot sleeve notches formed thereon adjacent the bearing gap to facilitate local deformation of the pivot sleeve radially outward from the axis of rotation between the pivot sleeve contact areas.

In another embodiment of the actuator arm assembly of the present invention, the pivot sleeve is press fit to and within the actuator bore. The actuator bore may have several pivot sleeve contact areas and the pivot cartridge may have several bearing gaps disposed in radial alignment with respective ones of the pivot sleeve contact areas.

DESCRIPTION OF THE PREFERRED EMBODIMENTS

Figure 1:
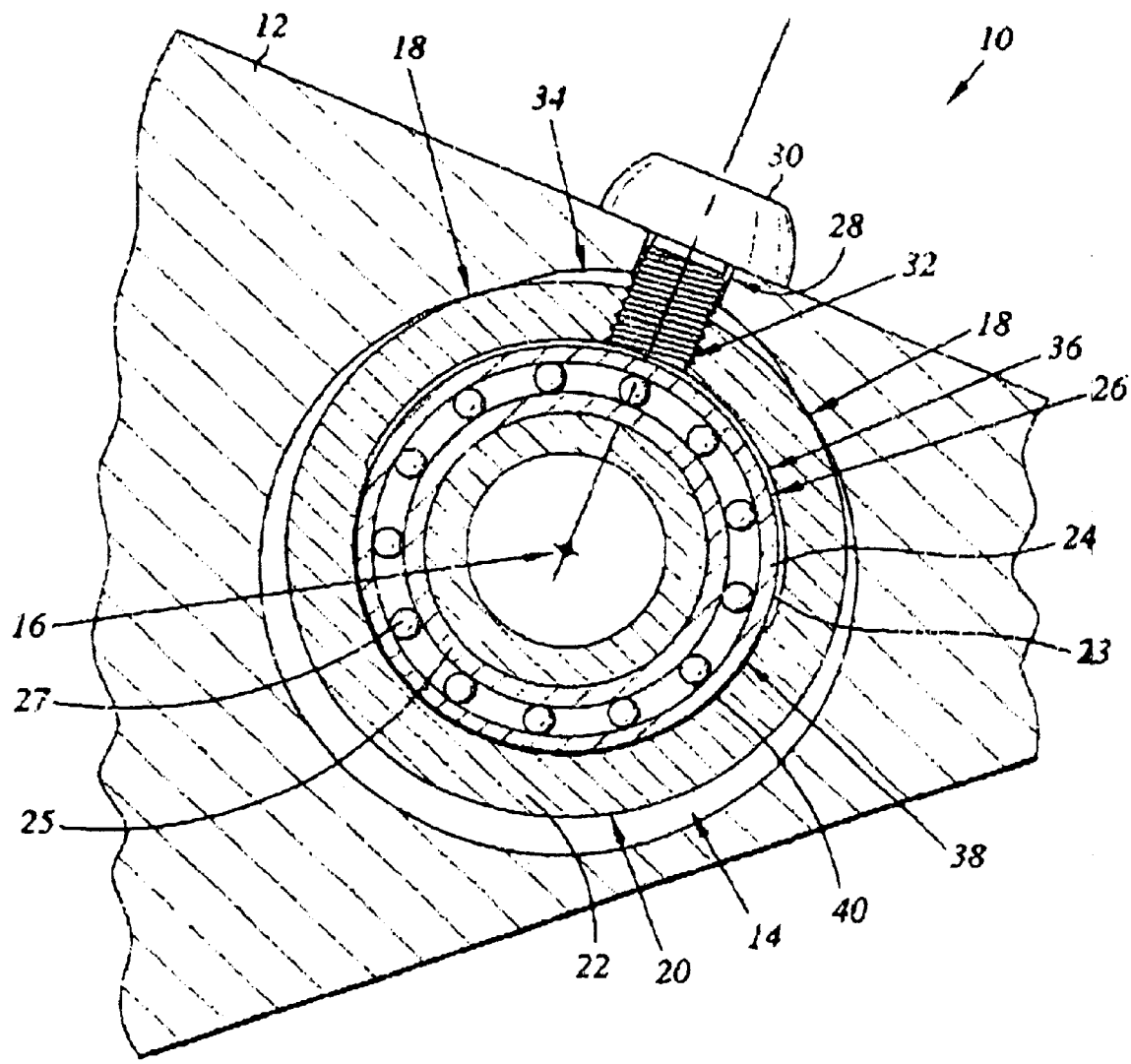
FIG. 1 is a top view of a portion of an actuator arm assembly including a bearing gap formed between a pivot sleeve and a bearing outer race as constructed in accordance with an embodiment of the present invention.

Referring now to FIG. 1 there is depicted a top view of a portion of an actuator arm assembly 10 according to an embodiment of the present invention. The actuator arm assembly 10 includes an actuator arm 12 having an actuator bore 14 disposed therethrough. The actuator arm 12 is configured to pivot about an axis of rotation 16 which is axially disposed within the actuator bore 14. The actuator bore 14 has pivot sleeve contact areas 18. In the embodiment depicted, the actuator bore 14 has two such pivot sleeve contact areas 18. The actuator arm assembly 10 further includes a pivot cartridge 20 which is concentrically received within the actuator bore 14 and biased towards the pivot sleeve contact areas 18. The pivot cartridge 20 includes a pivot sleeve 22 and a bearing assembly 23 which is positioned within the pivot sleeve 22. The bearing assembly 23 includes the bearing outer race 24, a bearing inner race 25 and bearings balls 27 secured therebetween. The pivot sleeve 22 is formed to exert compressive force radially from the axis of rotation 16 against the actuator bore 12 adjacent the pivot sleeve contact areas 18. In this regard, it is contemplated that the pivot sleeve contact areas 18 extend along the inner surface of the actuator bore 14 in an elongate strip. The pivot sleeve 22 is formed to locally deform radially relative to the axis of rotation 16 adjacent the pivot sleeve contact areas 18. In the embodiment shown in FIG. 1, the pivot sleeve 22 is formed to locally deform radially outward form the axis of rotation 16 adjacent the pivot sleeve contact areas 18. The bearing outer race 24 is concentrically received within and partially concentrically attached to the pivot sleeve 22. The pivot cartridge 20 further includes a bearing gap 26 formed between the bearing outer race 24 and the pivot sleeve 22 for inhibiting transfer of force between the pivot sleeve 22 and the bearing outer race 24, thereby mitigating deformation of the bearing outer race 24 in order to mitigate torque ripple on the actuator arm 12 about the axis of rotation 16.

In an embodiment of the present invention, the actuator arm further has a screw hole 28 which generally radially extends toward and perpendicular to the axis of rotation 16. The actuator arm assembly 10 further includes a screw 30 which is sized and configured to attach the pivot sleeve 22 to the actuator arm 12. The actuator arm 12 is formed to receive the screw 30 with the screw 30 being axially aligned perpendicular to the axis of rotation 16. The screw 30 is engaged with the pivot sleeve 22 between the pivot sleeve contact areas 18 of an adjacentmost portion of the actuator bore 14. The pivot sleeve 22 has a screw engagement hole 32 formed therein for thread engagement of the screw 30. The actuator bore 14 may include an actuator bore notch 34 formed therein, preferably between the pivot sleeve contact areas 18.

It is contemplated that attachment of the pivot sleeve 22 with the screw 30, the screw 30 causes the pivot sleeve to be subjected to forces as translated through the thread engagement with the screw engagement hole 32 in a radial direction towards the screw hole 28 of the actuator arm 12. Such forces may result in a strain in the pivot sleeve 22 locally thereat. The inclusion of the actuator bore notch 34 allows for deformation of the pivot sleeve 22 locally about the screw engagement hole 32. In addition, the pivot sleeve contact areas 18 may be disposed about an arc which is less than 180 degrees about the axis of rotation 16. In this regard, as depicted the pivot sleeve contact areas 18 are disposed about an arc which about 75 degrees.

The pivot sleeve 22 may have a gap portion 36 which is disposed adjacent the bearing gap 26 and an attachment portion 38 which is attached to the bearing outer race 24. The attachment portion 38 may be adhesively bonded to the outer race 24. In this regard, adhesive 40 may be disposed between the bearing outer race 24 and the pivot sleeve 22 at the attachment portion 38. In this embodiment, it is contemplated that the outer radius of the bearing outer race 24 is less than the inner radius of the pivot sleeve 22 with the adhesive 40 filling region therebetween. It is contemplated that the adhesive 40 facilitates the formation of the bearing gap 26 by securely positioning the bearing outer race 24 within the pivot sleeve 22.

The bearing gap 26 may be further formed by the gap portion 36 being generally defined by an average first radius from the axis of rotation 16 and the attachment portion 38 being generally defined by an average second radius from the axis of rotation 16, with the average first radius being greater than the average second radius.

Figure 2:
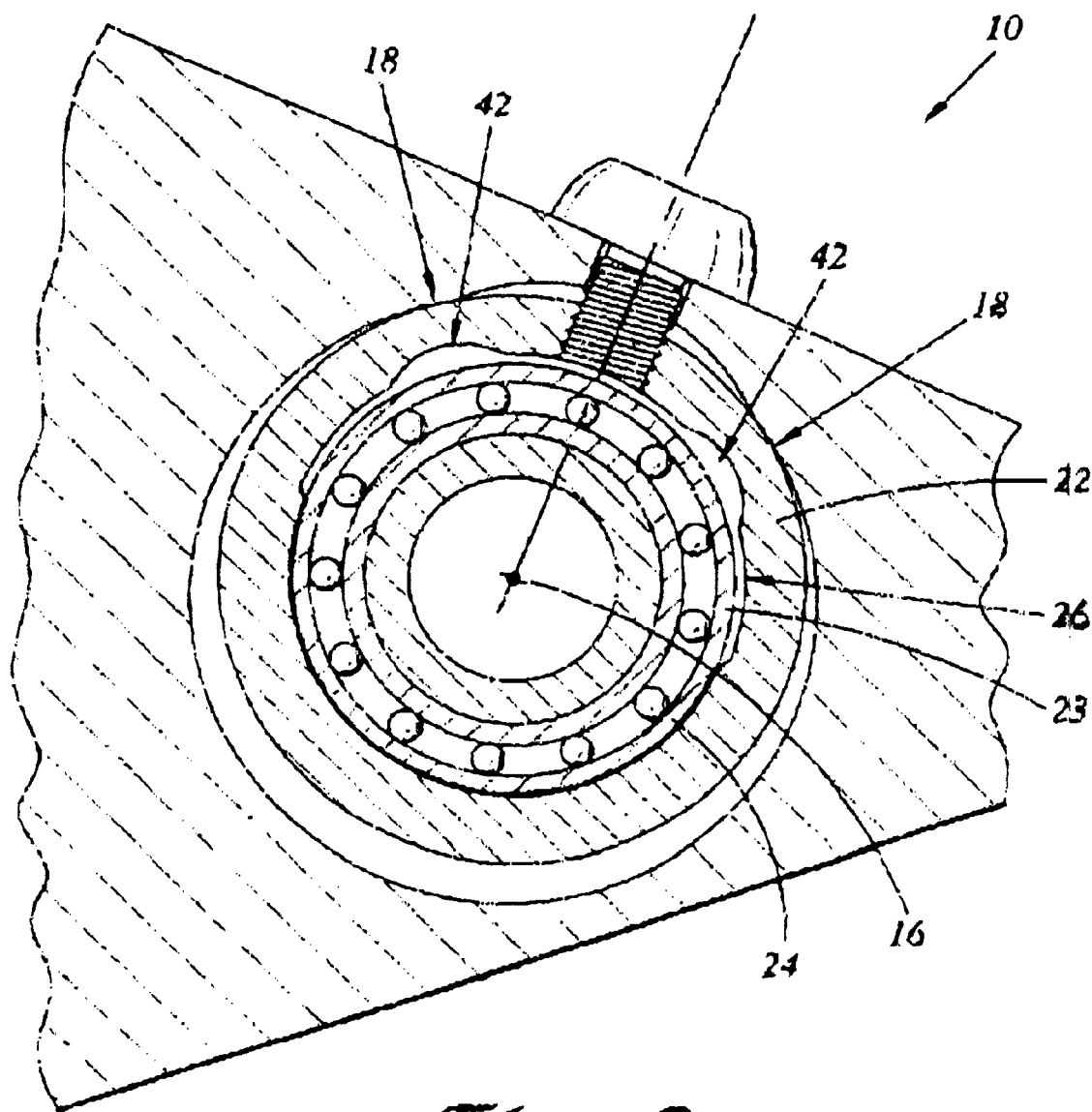
FIG. 2 is a top view of another embodiment of an actuator arm assembly of the present invention having a pivot sleeve with two notches formed therein to facilitate local deformation therebetween.

Referring now to FIG. 2, the pivot sleeve 22 may be formed to locally deform radially outward from the axis of rotation 16 between the pivot sleeve contact areas 18. The pivot sleeve 22 be formed to have pivot sleeve notches 42 formed thereon adjacent the bearing gap 26 to facilitate local deformation of the pivot sleeve 22 radially outward from the axis of rotation 16 between the pivot sleeve contact areas 18.

Figure 3:
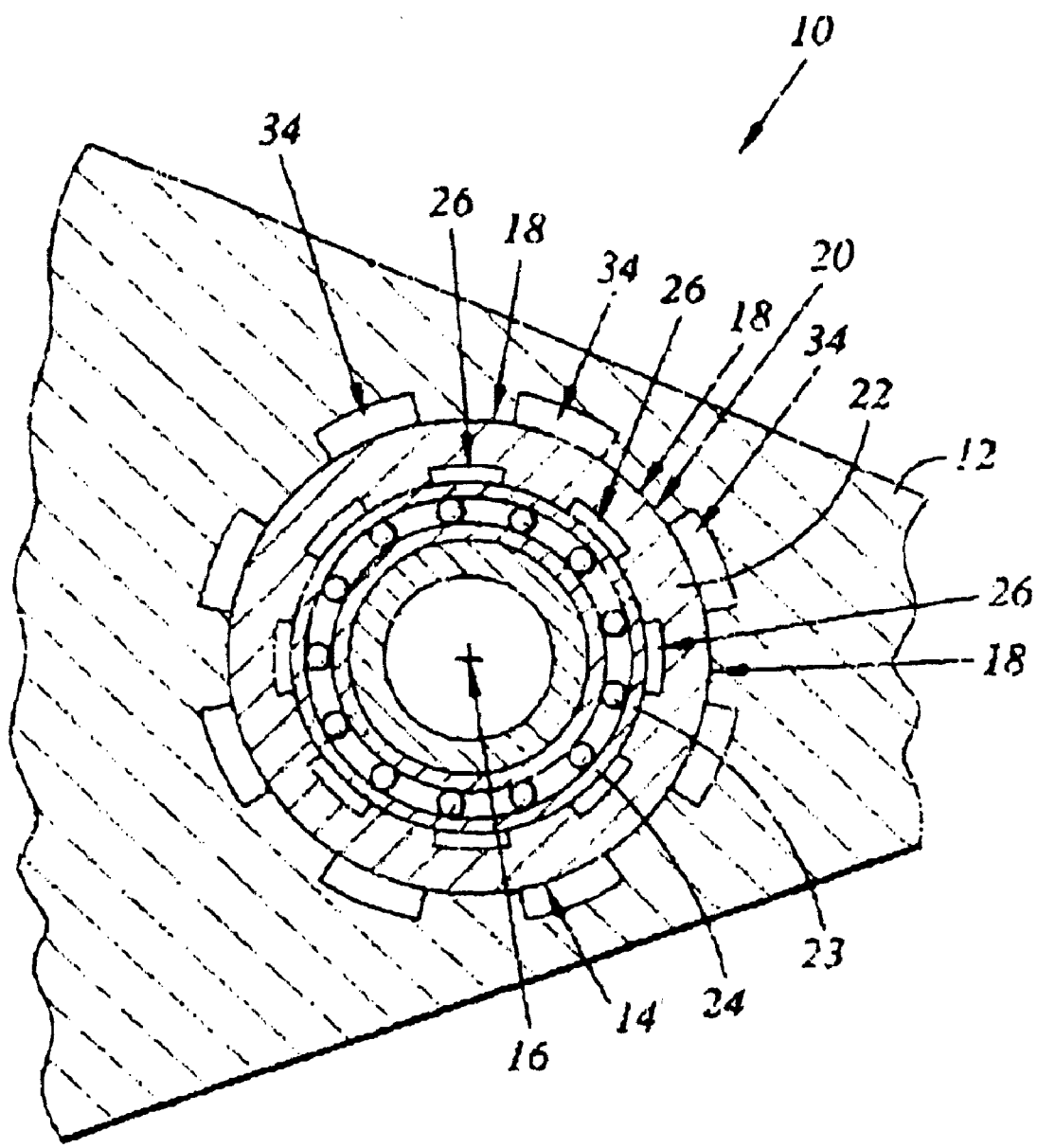
FIG. 3 is a top view of another embodiment of the actuator arm assembly of the present invention having a bearing outer race press fit with in a pivot sleeve which is press fit within an actuator bore.

Referring now to FIG. 3, in another embodiment of the actuator arm assembly 10 of the present invention, the pivot sleeve is press fit to and within the actuator bore 14. In this regard, the actuator bore 14 may have several pivot sleeve contact areas 18 with actuator bore notches 34 formed therebetween. The pivot sleeve 22 is in compressive contact with the pivot sleeve contact areas 18. Furthermore, the bearing outer race 24 is concentrically received within and partially concentrically attached to the pivot sleeve 22. In this embodiment, the bearing outer race 24 of the bearing assembly 23 is press fit within the pivot sleeve 22. The pivot cartridge 20 further includes multiple bearing gaps 26 formed between the bearing outer race 24 and the pivot sleeve 22 for inhibiting transfer of force between the pivot sleeve 22 and the bearing outer race 24 adjacent thereto, thereby mitigating deformation of the bearing outer race 24. In this regard, the inclusion of the bearing gap 26 allows the pivot sleeve 22 to locally deform radially inward towards the axis of rotation 16 while avoiding compression force upon the bearing outer race 24 thereat. The bearing gaps 26 mitigates torque ripple on the actuator arm 12 during rotation thereof due to deformation of the bearing outer race 24. Preferably, the bearing gaps 26 are radially aligned with the pivot sleeve contact areas 18. In this regard, it is desirable that there are equal numbers of bearing gaps 26 and pivot sleeve contact areas 18.

We claim:

1. An actuator arm assembly for use in a disk drive, the actuator arm assembly comprising:

an actuator arm having an actuator bore disposed therethrough, the actuator arm being configured to pivot about an axis of rotation axially disposed within the actuator bore, the actuator bore having pivot sleeve contact areas; and a pivot cartridge concentrically received within the actuator bore, the pivot cartridge comprising:

a pivot sleeve formed to exert compressive force radially from the axis of rotation against the actuator bore adjacent the pivot sleeve contact areas, the pivot sleeve being formed to locally deform radially relative to the axis of rotation adjacent the pivot sleeve contact areas;

a bearing outer race concentrically received within and partially concentrically attached to the pivot sleeve; and a bearing gap formed between the bearing outer race and the pivot sleeve for inhibiting transfer of force between the pivot sleeve and the bearing outer race, thereby mitigating deformation of the bearing outer race in order to mitigate torque ripple on the actuator arm during rotation about the axis of rotation;

wherein the actuator bore having an actuator bore notch formed therein between the pivot sleeve contact areas.

2. The actuator arm assembly of claim 1 wherein the actuator arm further having a screw hole generally radially extending toward and perpendicular to the axis of rotation.

3. The actuator arm assembly of claim 2 further comprises a screw which is sized and configured to attach the pivot sleeve to the actuator arm, the actuator arm is formed to receive the screw with the screw being axially aligned perpendicular to the axis of rotation.

4. The actuator arm assembly of claim 3 wherein the screw is engaged with the pivot sleeve between the pivot sleeve contact areas of an adjacentmost portion of the actuator bore.

5. The actuator arm assembly of claim 1 wherein the pivot sleeve contact areas are disposed about an arc which is less than 180 degrees about the axis of rotation.

6. The actuator arm assembly of claim 1 wherein the pivot sleeve has a gap portion which is disposed adjacent the bearing gap and an attachment portion which is attached to the bearing outer race.

7. The actuator arm assembly of claim 6 wherein the attachment portion is adhesively bonded to the outer race.

8. The actuator arm assembly of claim 6 wherein the gap portion is generally defined by an average first radius from the axis of rotation and the attachment portion is generally defined by an average second radius from the axis of rotation, the average first radius is greater than the average second radius.

9. The actuator arm assembly of claim 1 the pivot sleeve is formed to locally deform radially outward from the axis of rotation between the pivot sleeve contact areas.

10. The actuator arm assembly of claim 9 wherein the pivot sleeve has two pivot sleeve notches formed thereon adjacent the bearing gap to facilitate local deformation of the pivot sleeve radially outward from the axis of rotation between the pivot sleeve contact areas.

11. The actuator arm assembly of claim 1 wherein the pivot sleeve is adhesively bonded to the outer race.

12. The actuator arm assembly of claim 1 wherein the pivot sleeve is press fit to and within the actuator bore.

13. The actuator arm assembly of claim 12 wherein the actuator bore has several pivot sleeve contact areas, the pivot cartridge has several bearing gaps disposed in radial alignment with respective ones of the pivot sleeve contact areas.

14. The actuator arm assembly of claim 12 wherein the bearing outer race is press fit to and within the pivot sleeve.

15. An actuator arm assembly for use in a disk drive, the actuator arm assembly comprising:

an actuator arm having an actuator bore disposed therethrough, the actuator arm being configured to pivot about an axis of rotation axially disposed within the actuator bore, the actuator arm having a screw hole generally radially extending toward and perpendicular to the axis of rotation, the actuator bore having pivot sleeve contact areas;

a pivot cartridge concentrically received within the actuator bore, the pivot cartridge comprising:

a pivot sleeve formed to exert compressive force radially from the axis of rotation against the actuator bore adjacent the pivot sleeve contact areas, the pivot sleeve being formed to locally deform radially relative to the axis of rotation adjacent the pivot sleeve contact areas;

a bearing outer race concentrically received within and partially concentrically attached to the pivot sleeve; and a bearing gap formed between the bearing outer race and the pivot sleeve for inhibiting transfer of force between the pivot sleeve and the bearing outer race, thereby mitigating deformation of the bearing outer race in order to mitigate torque ripple on the actuator arm during rotation about the axis of rotation; and a screw sized and configured to attach the pivot sleeve to the actuator arm, the screw being engaged with the pivot sleeve between the pivot sleeve contact areas of an adjacentmost portion of the actuator bore, wherein the actuator arm being to receive the screw with the screw being axially aligned perpendicular to the axis of rotation.

16. The actuator arm assembly of claim 15 wherein the actuator bore having an actuator bore notch formed therein between the pivot sleeve contact areas.

17. The actuator arm assembly of claim 15 wherein the pivot sleeve contact areas are disposed about an arc which is less than 180 degrees about the axis of rotation.

18. The actuator arm assembly of claim 15 wherein the pivot sleeve has a gap portion which is disposed adjacent the bearing gap and an attachment portion which is attached to the bearing outer race.

19. The actuator arm assembly of claim 18 wherein the attachment portion is adhesively bonded to the outer race.

20. The actuator arm assembly of claim 18 wherein the gap portion is generally defined by an average first radius from the axis of rotation and the attachment portion is generally defined by an average second radius from the axis of rotation, the average first radius is greater than the average second radius.

21. The actuator arm assembly of claim 15 the pivot sleeve is formed to locally deform radially outward from the axis of rotation between the pivot sleeve contact areas.

22. The actuator arm assembly of claim 15 wherein the pivot sleeve is adhesively bonded to the outer race.

* * * * *